March 12, 1946.  C. B. VICKERS  2,396,352
PROPELLER TRANSMISSION
Filed Oct. 31, 1942  2 Sheets-Sheet 1

INVENTOR
Carroll B. Vickers,
BY
Beau, Brooks, Buckley & Beau.
ATTORNEYS

March 12, 1946.     C. B. VICKERS     2,396,352

PROPELLER TRANSMISSION

Filed Oct. 31, 1942     2 Sheets-Sheet 2

INVENTOR
Carroll B. Vickers,
BY
Beau, Brooks, Buckley & Beau.
ATTORNEYS

Patented Mar. 12, 1946

2,396,352

UNITED STATES PATENT OFFICE 2,396,352

PROPELLER TRANSMISSION

Carroll B. Vickers, Buffalo, N. Y.

Application October 31, 1942, Serial No. 464,122

3 Claims. (Cl. 170—135.5)

This invention relates to the aircraft art and primarily to the propeller system thereof.

To start an airplane in motion from a standstill it is the usual custom to speed up the propeller, this being required to increase the driving power of the engine for overcoming the abnormal resistance at this time. It has heretofore been proposed to mount the propeller blades for adjustment to enable their pitch being varied so as to change in effect the driving ratio between the source of power and the propeller in its contact with the airstream, such adjustment of the propeller blades being accomplished by a small electric motor operating through a speed reduction gearing and thereby requiring an interval of time to accomplish the desired adjustment. Because of the high speed of present day air travel it is vital that the propeller be responsive immediately to the demand of the pilot for utmost safety.

The primary object of the present invention is to provide an automatic propeller system which is highly efficient and practical and is readily responsive to any demand for acceleration. Further, the invention has for its aim the provision of a compensating power transmission in the propeller system which will act in accordance with the air resistance offered the propeller and thereby make reliable the propulsion of the aircraft in an emergency or under conditions, such as may be encountered when starting the aircraft in motion or when accelerating or climbing rapidly in flight, when more power is required to maintain the optimum R. P. M. of the propeller.

The invention further has for its object to provide a power system wherein the speed ratio of the driving connection is varied in response to the load whereby the peak of efficiency of the motor or engine is maintained.

The invention also resides in the salient features of construction and the novel parts and their arrangements, more clearly set forth in the following description.

Figure 1:
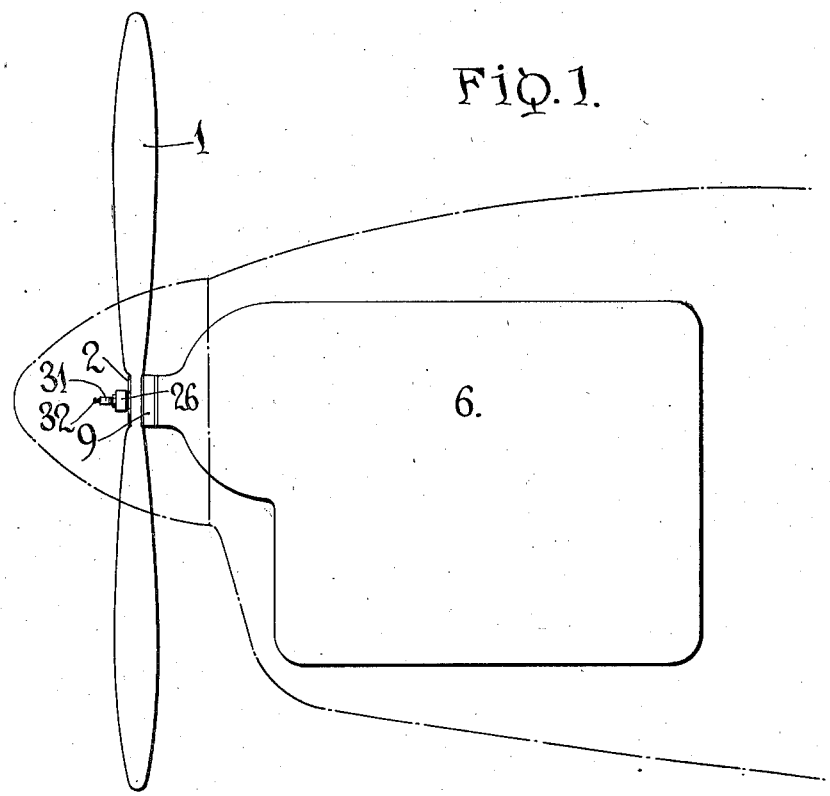
Fig. 1 is a fragmentary side elevation of an aircraft embodying a system of propulsion in accordance with the present invention.
Figure 3:
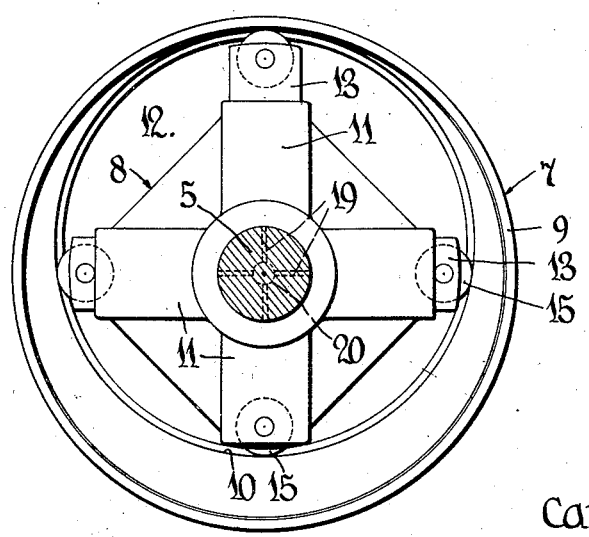
Fig. 3 is an inside view of the hydraulic clutch chamber.
Figure 2:
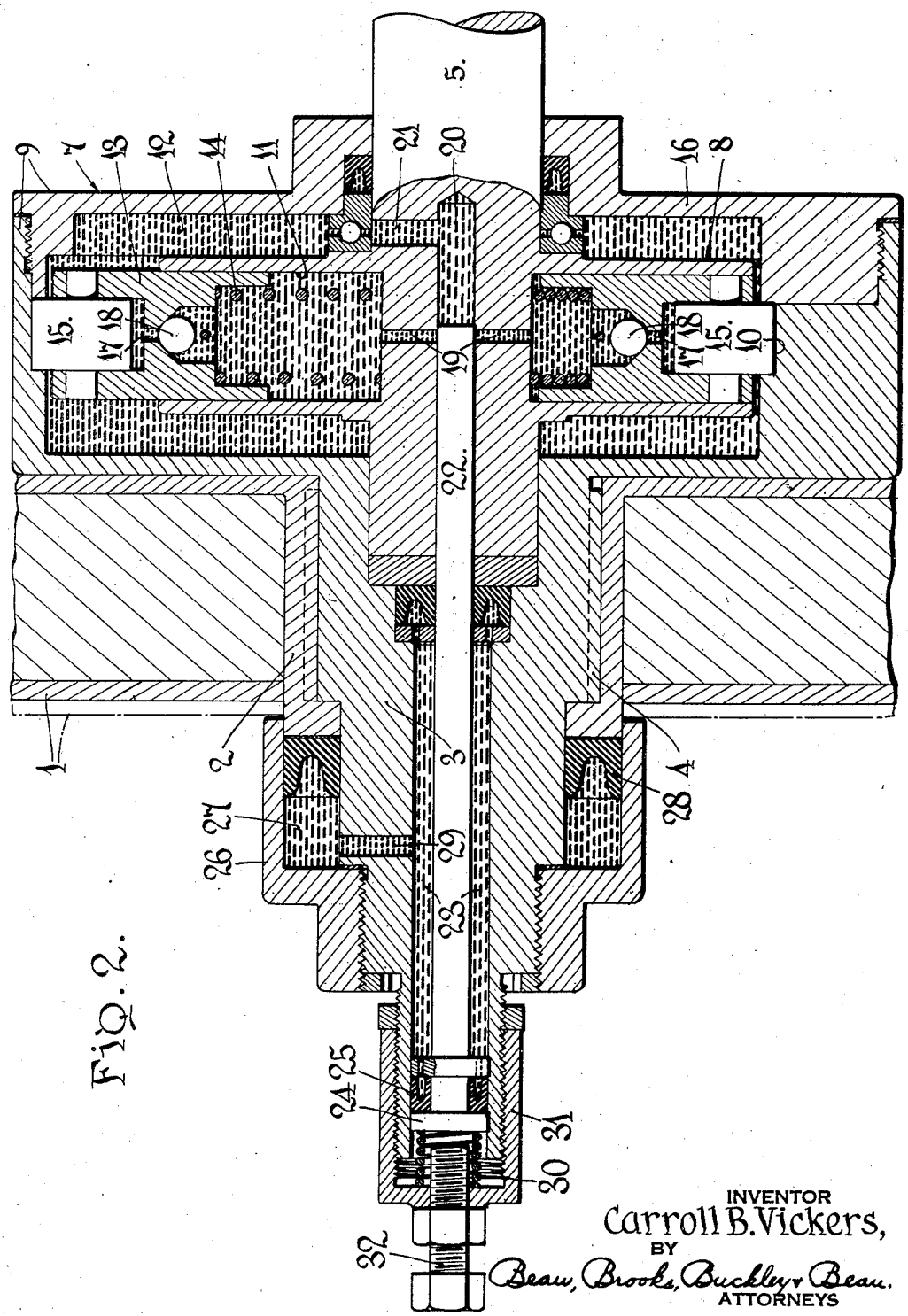
Fig. 2 is an enlarged sectional view taken axially through the compensating transmission and the hub of the propeller.

Referring more particularly to the drawings, numeral 1 designates the propeller of an aircraft having a hub 2 which is splined to a shaft 3 by a feather key 4 for limited axial movement. The pitch of the fixed propeller blades is calibrated to give the greatest efficiency at cruising speed at which time the engine and propeller are directly connected. The propeller or driven shaft 3 is connected to the shaft 5 of an engine or motor 6 by a compensating transmission generally indicated by the numeral 7, said transmission being designed to vary the driving ratio between the propeller and its engine in order to maintain the operation of the latter at substantially its maximum efficiency and with a minimum loss of power at the propeller.

This compensating transmission unit 7, according to the present disclosure, comprises a hydraulic clutch having a driving member 8 and a driven member 9, the latter being in the form of a chambered cylindrical casing fixedly related to the propeller shaft 3 and carrying an internal cam track 10. The driving member comprises one or more radially disposed fluid pumping cylinders or chambers 11 fixed to the engine or driving shaft 5 within a reservoir 12 in the driven member 9, each cylinder having a piston or fluid displacing member 13 slidable radially therein and urged outwardly by a spring 14. An antifriction roller 15 is carried by the protruding end of the piston 13 for tracking on the cam 10. The reservoir 12 which is accessible through a closure or removable plate 16 contains the hydraulic body. Each piston is provided with an inlet port 17 containing a ball check valve 18 seating outwardly against retrograde fluid movement, and each cylinder 11 is provided with an outlet port 19 communicating with an axial passage 20 in the drive shaft and which discharges through radial passages 21 back into the reservoir.

Therefore, upon the rotation of the drive shaft 5 the outer ends of the pistons will follow the cam track 10 and thereby effect a circulation of the liquid inwardly through the pumps and back to the reservoir. By restricting one of the ports of each pump a resistance to this fluid circulation will develop and result in a fluid coupling of the drive shaft to the driven shaft, such restriction being herein automatically varied in accordance with the axial thrust of the propeller. It is obvious from the foregoing that if the outflow passage is fully opened the pistons 13 will merely circulate the fluid idly through the pumps and thereby fail to exert any driving influence on the casing 9 and its connected propeller. When, however, the outflow passage 19, 20, 21 is restricted, there will be less slippage between the driving and driven elements in accordance with the amount of restriction. This slippage will enable the engine to increase its speed of operation in order to maintain the propeller operating at its maximum efficiency. Should the outflow passage be fully closed the driven shaft 3 will be connected directly to the drive shaft for rotation as a unit therewith.

For controlling the capacity of the outflow passages there is provided a valve 22 which is herein slidably mounted in the end of the drive shaft and extends through an axial chamber 23 in the driven shaft. The valve 22 is designed for being moved inwardly across the radial ports 19 to fully close or variably throttle the same. The outer end of the valve stem has a piston 24 which operates in the axial chamber and is suitably packed at 25. Carried by the driven shaft is a cylindrical casing 26 forming an annular chamber 27 in which is slidably mounted an annular piston 28 suitably packed against fluid leakage, the annular chamber 27 communicating with the axial chamber 23 by a port 29. The annular piston 28 is adapted to be acted upon by the propeller hub 2, the axial thrust of the propeller hub acting to move the annular piston inwardly to displace the liquid from the chamber 27 through the port 29 into the axial chamber 23. This action will result in moving the valve connected piston 24 outwardly against a spring 30 and accordingly uncover the outlet port 19 so as to permit less restricted flow of the transmission fluid from the cylinders 11. The pressure of the spring 30, which is in the form of a coil spring, is regulated by a cap 31 threaded onto the outer end of the driven shaft 3, and the extent of opening movement of the valve may be regulated by a set screw 32 threaded in the cap to serve as an abutment for the valve connected piston 24. The axial movement of the propeller may be limited by suitable shoulders, such as provided by opposing parts of the clutch housing 9 and the annular chamber casing 26.

In operation, the pressure of the spring 30 will be adjusted to permit opening of the transmission valve 22 at a predetermined thrust pressure of the propeller hub 2 against the annular piston 28, and when the valve is opened by such pressure the restriction to fluid flow through the port 19 will be correspondingly lessened, thereby permitting certain slippage or relative movement between the drive and driven shaft so that the engine may speed up its R. P. M. and develop its maximum power for maintaining the propeller effective for its greatest efficiency. Consequently, when starting the aircraft in motion, the thrust exerted by the propeller in moving or tending to move the airplane through the air will determine the drive ratio between the engine and the propeller whereby to allow the engine to produce its full rated power for keeping the propeller turning at its optimum R. P. M. After the aircraft starts in motion and the propeller thrust decreases, the fluid slippage will become gradually less with the result that the driving ratio will vary gradually into the direct drive for cruising speed. If it is desired to gain altitude, for which purpose the aircraft would be pointed upwardly, the engine will be accelerated and act to increase the propeller R. P. M. which will produce the predetermined propeller thrust necessary to open the valve 22 for providing fluid slippage through the ports 19 so that the optimum R. P. M. of the propeller, for which it is designed, will be maintained under the accelerator engine.

The automatic control and transmission may be utilized in other types of motor vehicles or in other mechanical combinations wherein the load varies, such as is found in some uses of the Diesel engine, and while the description has been given in detail, it will be understood that the illustrated embodiment is merely illustrative of the inventive principles involved, which latter may be incorporated in other physical embodiments without departing from the spirit or scope of the invention claimed.

What is claimed is:

1. An aircraft having a propeller with fixed blades, an engine for driving the propeller, a fluid transmission interposed between the engine and the propeller for a normal direct drive relationship and having means providing for fluid slippage to enable engine acceleration while substantially maintaining optimum speed of rotation of the propeller, said propeller being mounted for thrust responsive movement in an axial direction, and means operable by the thrust responsive movement of the propeller for regulating the fluid slippage whereby to maintain substantially at optimum speed of rotation of the propeller by allowing the engine to maintain or approach its optimum speed of operation.

2. An aircraft having a propeller with fixed blades, a driven shaft mounting the propeller for axial thrust imparted movement, a drive for the driven shaft, a fluid transmission interposed between the drive and the driven shaft for varying the driving ratio therebetween and having means providing for fluid slippage to enable acceleration of the drive while substantially maintaining a predetermined speed of operation for the propeller, and means responsive to the thrust movement of the propeller for regulating the fluid slippage whereby to enable an acceleration of the drive for maintaining substantially the optimum speed of operation for the propeller.

3. An aircraft having a propeller, a driven shaft supporting the propeller for limited axial thrust movement, an engine for driving the shaft, a fluid transmission interposed between and normally connecting the engine and the propeller for cruising speed, said transmission having means providing for fluid slippage to enable engine acceleration, and means responsive to the thrust movement of the propeller and operatively connected to the fluid transmission for regulating the fluid slippage whereby to maintain substantially the optimum R. P. M. of the propeller by permitting engine acceleration.

CARROLL B. VICKERS.